US011126224B2

United States Patent
Patton et al.

(10) Patent No.: US 11,126,224 B2
(45) Date of Patent: Sep. 21, 2021

(54) ALTERNATING SAMPLING METHOD FOR NON-ECHO DUPLEX CONVERSATIONS ON A WEARABLE DEVICE WITH MULTIPLE SPEAKERS AND MICROPHONES

(71) Applicant: Snap Inc., Santa Monica, CA (US)

(72) Inventors: Russell Douglas Patton, Playa Vista, CA (US); Jonathan M. Rodriguez, II, Beverly Hills, CA (US); Julio Cesar Castañeda, Redondo Beach, CA (US); Samuel Bryson Thompson, Downers Grove, IL (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/660,922

(22) Filed: Oct. 23, 2019

(65) Prior Publication Data
US 2020/0133332 A1  Apr. 30, 2020

Related U.S. Application Data

(60) Provisional application No. 62/753,529, filed on Oct. 31, 2018.

(51) Int. Cl.
*H04R 5/00* (2006.01)
*G06F 1/16* (2006.01)
(Continued)

(52) U.S. Cl.
CPC .......... *G06F 1/163* (2013.01); *G02B 27/0172* (2013.01); *G06F 3/165* (2013.01);
(Continued)

(58) Field of Classification Search
CPC ..... G06F 1/163; G06F 3/165; G02B 27/0172; G06T 19/006; H04R 3/005; H04R 2420/07; H04R 2499/11
(Continued)

(56) References Cited

U.S. PATENT DOCUMENTS 10,222,617 B2 *  3/2019  Jannard .................. G02C 11/10
2011/0216093 A1 *  9/2011  Griffin ................. H04M 1/0279
                                                      345/659
(Continued)

FOREIGN PATENT DOCUMENTS

EP   3062491 A1 *  8/2016  ............. H04W 4/06
EP   3062491 A1     8/2016
(Continued)

OTHER PUBLICATIONS

International Search Report and Written Opinion for International Application No. PCT/US2019/057531, dated Feb. 10, 2020 (Feb. 10, 2020)—14 pages.

*Primary Examiner* — Ammar T Hamid
(74) *Attorney, Agent, or Firm* — Culhane Meadows PLLC; Stephen J. Weed

(57) ABSTRACT

A wearable device includes a body having fasteners and a frame coupled between two fasteners. The frame includes first and second sections. A first portion of the body includes the first section of the frame and one fastener and a second portion of the body includes the second section of the frame and the other fastener. A speaker and a microphone are connected to the first portion and another speaker and another microphone are connected to the second portion. The body also includes a processor, memory accessible to the processor, and programming in the memory for configuring the processor to selectively activate the speakers and microphones such that a first speaker emits an output sound signal while a first microphone and a second speaker are deactivated and a second microphone captures an input sound signal during the emission of the output sound signal by the first speaker.

20 Claims, 15 Drawing Sheets

(51) Int. Cl.
   *G02B 27/01*      (2006.01)
   *G06F 3/16*       (2006.01)
   *G06T 19/00*      (2011.01)
   *H04R 3/00*       (2006.01)
(52) U.S. Cl.
   CPC .......... *G06T 19/006* (2013.01); *H04R 3/005* (2013.01); *H04R 2420/07* (2013.01); *H04R 2499/11* (2013.01)
(58) Field of Classification Search
   USPC ............................................ 381/123, 22, 23
   See application file for complete search history.

(56) References Cited

U.S. PATENT DOCUMENTS

| | | | |
|---|---|---|---|
| 2014/0116085 A1* | 5/2014 | Lam .................. | A41D 1/005 63/1.11 |
| 2016/0066660 A1* | 3/2016 | Pluemer .................. | A44C 5/14 224/165 |

FOREIGN PATENT DOCUMENTS

| | | | | |
|---|---|---|---|---|
| WO | 9807298 A1 | 2/1998 | | |
| WO | WO-9807298 A1 * | 2/1998 | ............. | G02C 11/10 |
| WO | 2016167877 A1 | 10/2016 | | |

\* cited by examiner

ALTERNATING SAMPLING METHOD FOR NON-ECHO DUPLEX CONVERSATIONS ON A WEARABLE DEVICE WITH MULTIPLE SPEAKERS AND MICROPHONES

CROSS-REFERENCE TO RELATED APPLICATIONS

This application claims priority to U.S. Provisional Application Ser. No. 62/753,529 entitled ALTERNATING SAMPLING METHOD FOR NON-ECHO DUPLEX CONVERSATIONS ON A WEARABLE DEVICE WITH MULTIPLE SPEAKERS AND MICROPHONES, filed on Oct. 31, 2018, the contents of which are incorporated fully herein by reference.

TECHNICAL FIELD

The present subject matter relates to electronic wearable devices and configuring embedded speakers and microphones to reduce echo during duplex communication for the wearer.

BACKGROUND

Portable eyewear devices, such as smartglasses, headwear, and headgear available today integrate microphones and speakers. Users of such portable eyewear devices may use the device to make phone calls or to perform verbal messaging that requires speaking and listening at the same time, known as duplex calling. Duplex calling can generate echo, which is sound from a sending device's microphone being returned to the sending device's speakers from a receiving device's microphone detecting the receiving device's speaker's sound.

Limiting the amount of echo in duplex calling can be useful. For example, echo increases sound distortion, and it is capable of causing so much distortion as to render the call incomprehensible, disorienting, and even painful for the people involved in the duplex call. Reduction of echo is an especially-felt need in portable eyewear devices, but it is a long-felt need in many other types of wearable devices.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
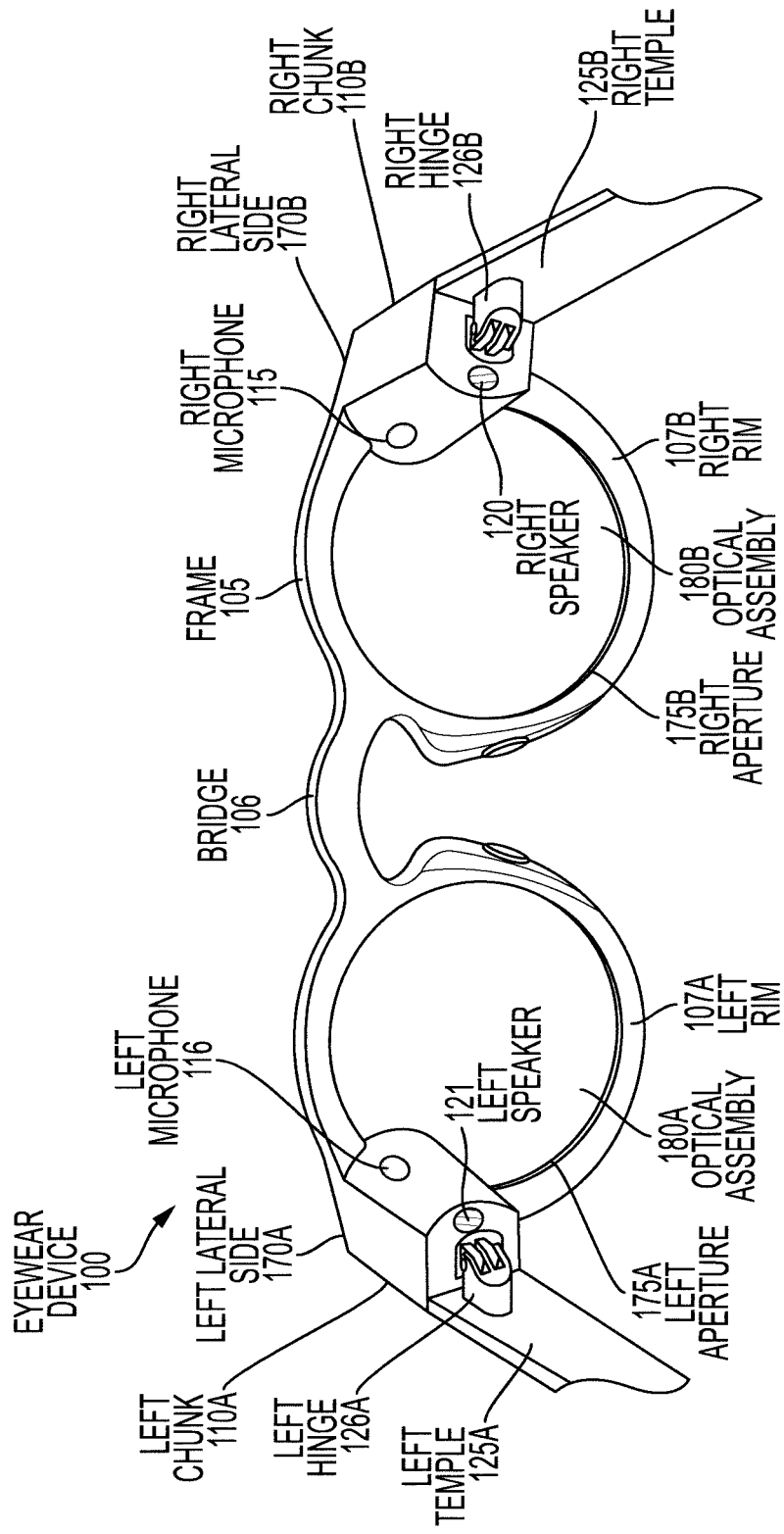
FIG. 1A is a rear view of an example hardware configuration of an eyewear device, which includes a microphone and a speaker connected to the left side of the eyewear frame, and a microphone and a speaker connected to the right side of the eyewear frame, for use in reducing echo on a duplex call.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical, or electrical connection, link, or the like by which signals or sound produced or supplied by one system element are imparted to another coupled element. Unless described otherwise, coupled elements or devices are not necessarily directly connected to one another and may be separated by intermediate components, elements, or communication media that may modify, manipulate or carry the sound or signals.

The orientations of the wearable device, associated components and any complete devices incorporating speakers and microphones such as shown in any of the drawings, are given by way of example only, for illustration and discussion purposes. In operation for a particular variable aural processing application, the wearable device may be oriented in any other direction suitable to the particular application of the wearable device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any transducer or component of a transducer constructed as otherwise described herein.

An example wearable device includes a body, which includes a first fastener, a second fastener, and a frame coupled between the first and second fasteners. The frame includes a first section and a second section. The body is divided into two portions, with the first portion of the body including the first section of the frame and the first fastener, and the second portion of the body including the second section of the frame and the second fastener. There is at least one first speaker connected to the first portion of the body, at least one second speaker connected to the second portion of the body, at least one first microphone connected to the first portion of the body, and at least one second microphone connected to the second portion of the body. The body also includes a processor coupled to the body, memory accessible to the processor, and programming in the memory.

Execution of the programming by the processor configures the wearable device to perform functions, including functions to selectively activate at least one of the first speaker or the second speaker. The execution of the programming by the processor further configures the wearable device to selectively activate at least one of the first microphone or the second microphone. The execution of the programming by the processor further configures the wearable device to emit an output sound signal via the activated first speaker while the first microphone and the second speaker are deactivated. Additionally, the execution of the programming by the processor further configures the wearable device to capture an input sound signal via the activated second microphone during the emission of the output sound signal by the activated first speaker.

Additional objects, advantages, and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a rear view of an example hardware configuration of an eyewear device 100, which includes a frame 105 with a left lateral side 170A including a left chunk 110A and a left temple 125A, as well as a right lateral side 170B including a right chunk 110B and a right temple 125B. In the illustrated example, the purpose of both temples 125 is to fasten the eyewear device to the user's head. Each temple 125 has a proximate end, which is the end connected to the frame 105 in this example, as well as a distal end, which is the end that extends away from the frame, and generally has an earpiece. The left chunk is connected to a left microphone 116 and a left speaker 121, while the right chunk is connected to a right microphone 115 and a right speaker 120. As shown in FIG. 1A, the eyewear device 100 is in a form configured for wearing by a user, which are eyeglasses in the example of FIG. 1A. The eyewear device 100 can take other forms and may incorporate other types of frameworks, for example, a headgear, a headset, or a helmet. Additional frameworks may also include a watch, a bracelet, or a necklace.

In the eyeglasses example, eyewear device 100 includes a frame 105, which includes a left rim 107A connected to a right rim 107B via a bridge 106 adapted for a nose of the user. The left and right rims 107A-B include respective apertures 175A-B which hold a respective optical element 180A-B, such as a lens. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105. As used herein, the chunks 110A-B can include an enclosure that encloses a collection of processing units, camera, sensors, etc. (e.g., different for the right and left side) that are encompassed in an enclosure.

In the example of FIG. 1A, the left chunk 110A includes a left microphone 116 and a left speaker 121. The right chunk 110B includes a right microphone 115 and a right speaker 120. A microphone 115, 116 is a transducer configured to convert sound into an electrical signal. A speaker 120, 121 is a transducer configured to convert an electrical signal into sound. In the example, these transducers are shown as four separate transducers. However, it is also possible to have one left transducer perform the tasks of both one left speaker 121 as well as one left microphone 116, while one right transducer can perform the tasks of both one right speaker 120 as well as one right microphone 115. In addition, in configurations where there are multiple left speakers or microphones, or multiple right speakers and microphones, essentially any number of left speakers and left microphones can be condensed into essentially any number of left transducers, and any number of right speakers and right microphones can be condensed into essentially any number of right transducers. As described in further detail below, the frame 105 or at least one of the left and right chunks 110A-B include circuit boards that includes the left microphone 116, the right microphone 115, the left speaker 121, and the right speaker 120. The microphones 115, 116 and the speakers 120, 121 can be connected to the circuit board by soldering, for example.

Other arrangements of the microphones 115, 116 and speakers 120, 121 can be implemented, including arrangements where the left microphone 116 and left speaker 121 are not congruent to the right microphone 115 and right speaker 120. The left microphone 116 can also be multiple microphones, and the left speaker 121 can also be multiple speakers, positioned anywhere on the left half of the frame or on the left lateral side. The number of left microphones 116 and left speakers 121 do not need to be correlated. Likewise, the right microphone 115 can also be multiple microphones, and the right speaker 120 can also be multiple speakers, positioned anywhere on the right half of the frame or on the right lateral side. The number of right microphones 115 and right speakers 120 do not need to be correlated. The functionality of this echo reduction device and method is based in the bilateral nature of the device—the composition, location, and number of speakers or microphones on either side is not the focus. A transducer capable of receiving sound, a transducer capable of generating sound (these transducers could be the same physical transducer) on both the left and right side (or first and second) side of the wearable device is the minimal configuration. Additional speakers and microphones on either side of the wearable may improve ease of use, but do not define the invention.

The microphones 115, 116 and speakers 120, 121 are arranged to face inward toward the user in order to pick up speech input from the user and direct sound output more effectively toward the user. Outward facing microphones 115, 116 and speakers 120, 121 could be utilized for a more speaker-phone type of phone call.

In an example, the microphones 115, 116 and speakers 120, 121 work in concert to provide an improved quality phone call. Upon receipt of a duplex call to the wearable device, a processor activates the left microphone 116 and right speaker 120, while the right microphone 115 and left speaker 121 are deactivated. This bilateral call mode uses the user's head to occlude sound, so that the left microphone 116 has reduced absorption of the right speaker's 120 produced sounds. This can reduce echo experienced by a device in communion with the wearable device that would result if the left microphone 116 and left speaker 121 were in use at the same time—only minimal occlusion can occur with a wearable device if the two components are on the same side of the user, because there is less distance and solid matter to attenuate the sound waves. This example also works using the opposite pairing, so that upon receipt of a call the processor activates that right microphone 115 and the left speaker 121, while the left microphone 116 and right speaker 120 are deactivated. This also can reduce echo that would result if the right microphone 115 and right speaker 120 were used at the same time.

In another example, the microphone 115, 116 and speakers 120, 121 work in concert to provide an improved quality phone call. Like the first example, the processor activates a pairing of either the left microphone 116 and right speaker 120 or the right microphone 115 and the left speaker 121, with the alternate pair being deactivated. In this second example, however, the processor rapidly alternates activating/deactivating the pairs (left microphone 116 and right speaker 120, right microphone 115 and left speaker 121), at a rate greater than the human ear is capable of noticing the activation cycling. This has a low threshold of 5 Hz, and an optimum rate of 40 Hz or faster (e.g., 44.8 Hz and above), but the cycling could be as fast as the wearable device is technically capable of cycling the power to these transducers. When the device cycles at these speeds, the user perceives sound coming from the speakers on the left 121 as well as the right 120 simultaneously, even though in fact the speakers 120, 121 are only producing sound each ½ of the duration of the call. The same is true with the microphones 115, 116, such that those on the other end of the call perceive a continuous stream of sound, even though each side of microphones are active only ½ of the duration of the call.

At the distances in use for a wearable device, the speed of sound as a factor in the algorithm controlling the alternating of microphone/speaker pairs is negligible. A larger wearable device, a wearable device that cannot utilize the occlusion effect caused by the user's body, a wearable device that alternates materially quicker than the optimal example, or a wearable device that imperfectly alternates between microphone/speaker pairs (such that the total active time is less than ½+½=1) may take the speed of sound into consideration to offer improved results by for example, adjusting the alternation to introduce a lag period between the deactivation of a speaker and the activation of a microphone.

Although not shown in FIG. 1A, the eyewear device 100 is coupled to a processor 843 and a memory 844, for example in the eyewear device 100 itself or another part of the system. Subsequent processing by the eyewear device 100 by the system, for example, using a coupled memory 844 and processor 843 in the system to process the captured sound from the microphone 115, 116, process the outgoing sound to the speakers 120, 121, and drive the activation of the pairs of microphone/speaker in order to cause the echo reduction effects previously discussed. Additionally, some or all of these functions can be instead performed by a digital signal processor (DSP) 812. A DSP 812 is a specialized processor for handling sound processing, and utilizing a DSP to perform the sound processing and/or the microphone/speaker switching can allow a more generalized processor 843 to handle other tasks like networking communication, power management, and other computing tasks necessary to the continued functioning of the wearable device 100.

Figure 1B:
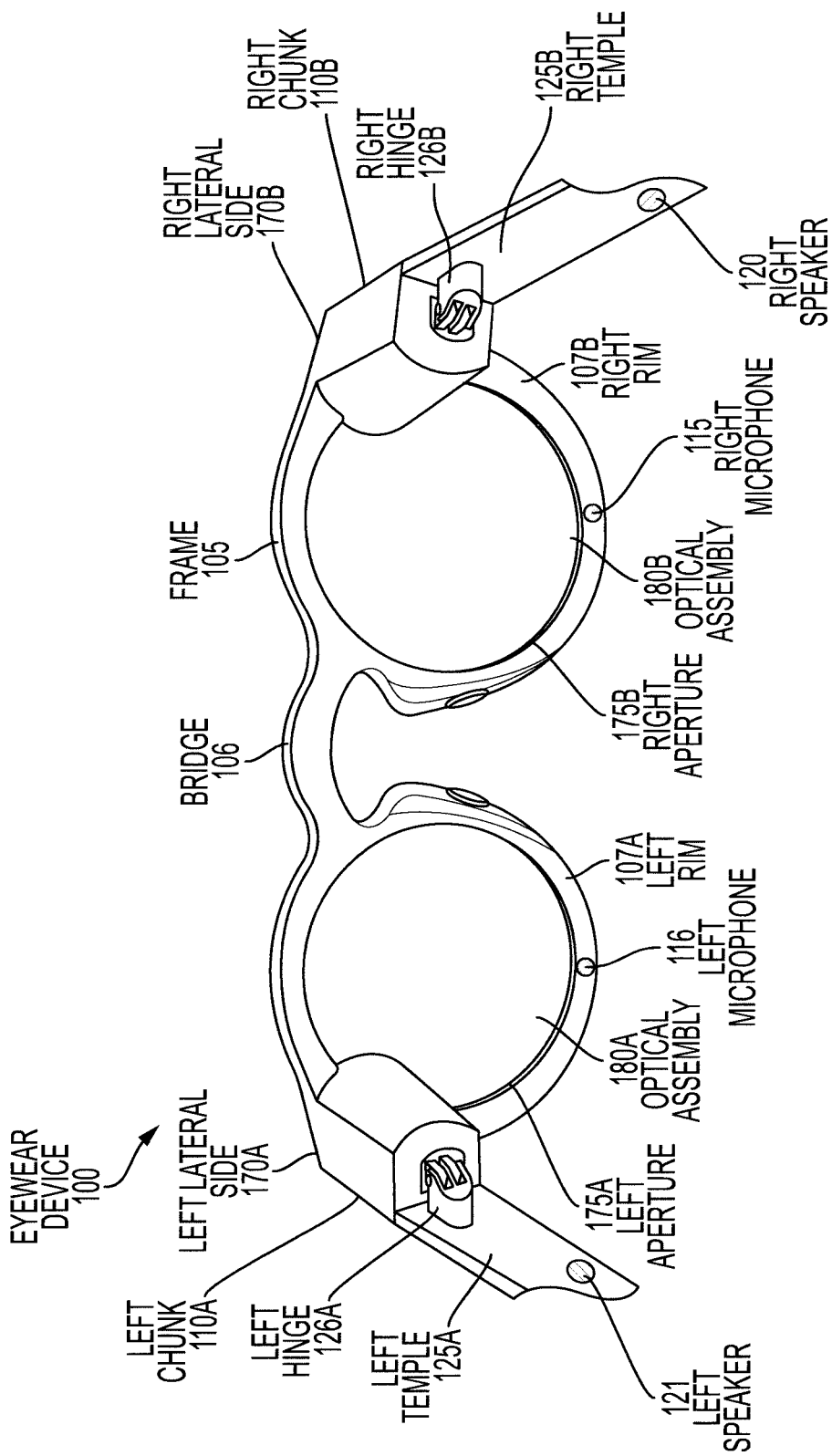
FIG. 1B is a rear view of an example hardware configuration of an eyewear device, which includes a microphone connected to the bottom of the left rim, a speaker connected to the left temple, a microphone connected to the bottom of the right rim, and a speaker connected to the right temple, for use in reducing echo on a duplex call.

FIG. 1B is another rear view of an example hardware configuration of an eyewear device 100. This device is similar to the device as described in FIG. 1A, except in this example, there are no microphones 115, 116 or speakers 120, 121 in either chunk 110. Instead, the left microphone 116 is located in the left rim 107A, the right microphone 115 is located in the right rim 107B, the left speaker 121 is located on the left temple 125A, and the right speaker 120 is located on the right temple 125B. In this example, the microphones 115, 116 are closer to the user's mouth (e.g., within 2 centimeters), and the speakers 120, 121 are closer to the user's ear (e.g., within 2 centimeters, which results in enhanced occlusion due to the increased distance between the microphone/speaker pairs, less sound necessary for the speakers 120, 121 to produce due to their proximity to the user's ears, and less sound needed for a clear signal to the microphones 115, 116 due to their proximity to the user's mouth, all resulting in reduced echo.

Figure 1C:
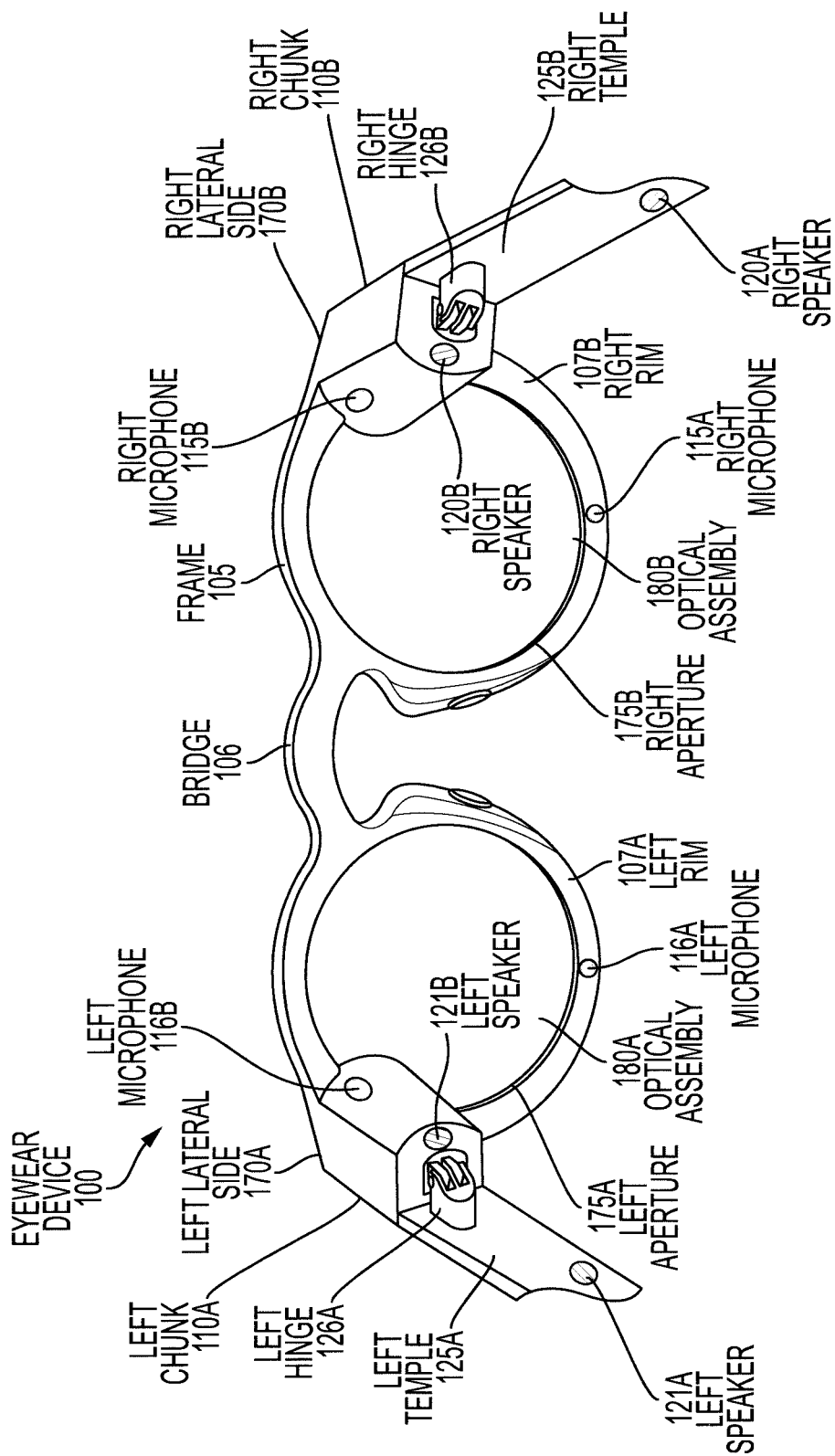
FIG. 1C is a rear view of an example hardware configuration of an eyewear device, combining the transducers present in FIG. 1A and FIG. 1B to have microphones on the bottom of the left and right rim, on the left and right chunk, as well as speakers on the left and right chunk, and on the left and right temple, for use in reducing echo on a duplex call.

FIG. 1C is another rear view of an example hardware configuration of an eyewear device 100. This device is similar to the device as described in FIG. 1A, except in this example, in addition to the left microphone 116B in the left chunk 110A, there is a left microphone 116A located in the left rim 107A. There is also a left speaker 121A in the left temple 125A in addition to the left microphone 116B in the left chunk 110A. This is paralleled in the right side as well: in addition to the right microphone 115B in the right chunk 110B, there is a right microphone 115A located in the right rim 107B. There is also a right speaker 120A in the right temple 125B in addition to the right microphone 115B in the right chunk 110B. FIG. 1C is a combination of the microphone 115, 116 and speaker 120, 121 placements from both FIG. 1A and FIG. 1B. Advantages to this design are having more microphones working together on either side, allowing for better absorption of sound from the user, and multiple speakers working together on either side, allowing for a lower perceivable volume to an outside observer while maintaining the same volume for the user to, for example, increase privacy of the call. This example also demonstrates that there can be multiple left microphones 116A-B, right microphones 115A-B, left speakers 121A-B, and right speakers 120A-B, acting together in the manner of an individual left microphone 116, right microphone 115, left speaker 121, and right speaker 120.

Figure 1D:
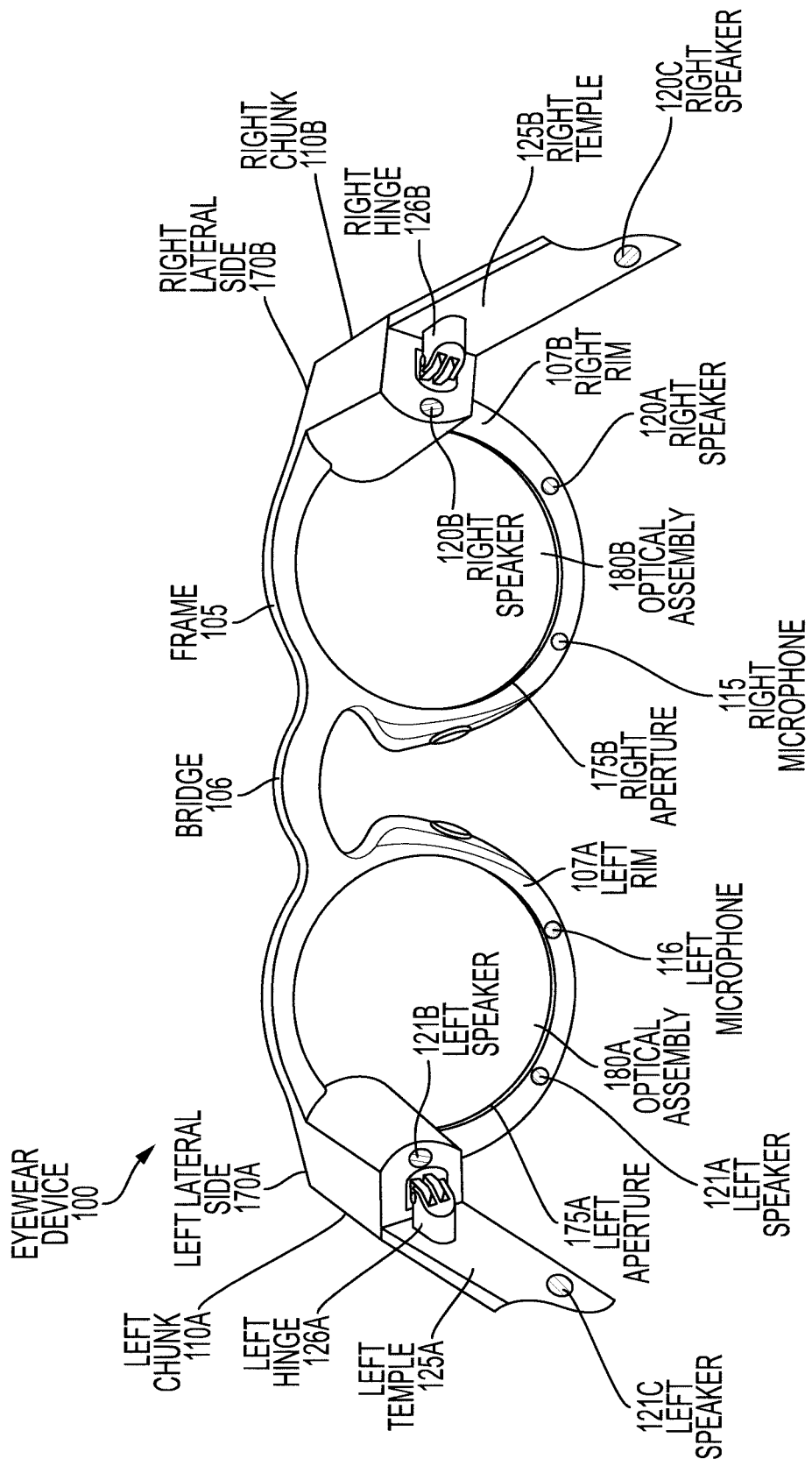
FIG. 1D is a rear view of an example hardware configuration of an eyewear device, which includes speakers on the bottom of the left and right rim, the left and right chunk, and the left and right temple, as well as microphones on the bottom of the left and right rim, for use in reducing echo on a duplex call.

FIG. 1D is another rear view of an example hardware configuration of an eyewear device 100. This device is similar to the device as described in FIG. 1A, except in this example, the left microphone 116 is located in the left rim 107A, and the right microphone 115 is located in the right rim 107B. Each side of the eyewear device instead has 3 speakers: there is a left speaker 121A in the left rim 107A, a left speaker 121B in the left chunk 110A, and a left speaker 121C in the left temple 125A. Additionally, there is a right speaker 120A in the right rim 107B, a right speaker 120B in the right chunk 110B, and a right speaker 120C in the right temple 125B. As compared to FIG. 1C, this example further emphasizes the privacy effect: using three speakers per side allows each individual speaker to be quieter in order to produce the same perceived volume for the user. An outside observer will have a more difficult time hearing the content of the speakers due to their individually lower volumes. This example also shows that the number of speakers 120, 121 does not need to match the number of microphones 115, 116.

Figure 1E:
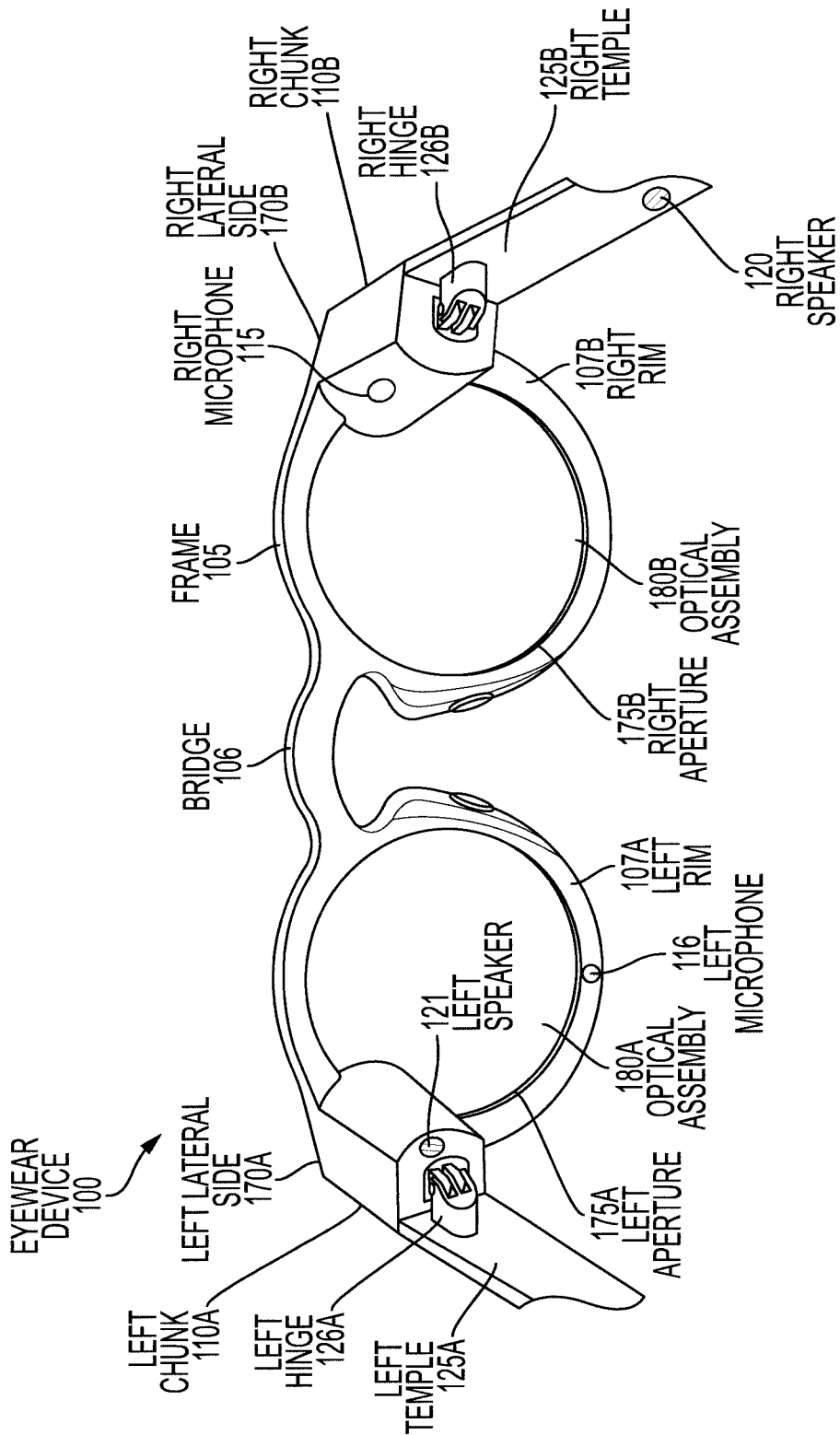
FIG. 1E is a rear view of an example hardware configuration of an eyewear device, which includes speakers on the left chunk and the right temple, as well as microphones on the bottom of the left rim, and the right chunk, for use in reducing echo on a duplex call.

FIG. 1E is another rear view of an example hardware configuration of an eyewear device 100. This device is substantially similar to the device as described in FIG. 1A, except in this example, the left microphone 116 is in the left rim 107A, while the right microphone is unmoved from the right chunk 110B. Additionally, the left speaker 121 remains in the left chunk 110A, while the right speaker 120 has been relocated to the right temple 125B. This example is to illustrate that the left microphone 116 and right microphone 115 do not need to exhibit bilateral symmetry. The left speaker 121 and right speaker 120 also do not need to exhibit symmetry. The lack of symmetry here is exaggerated, but even small differences in symmetry are still supported.

Figure 2A:
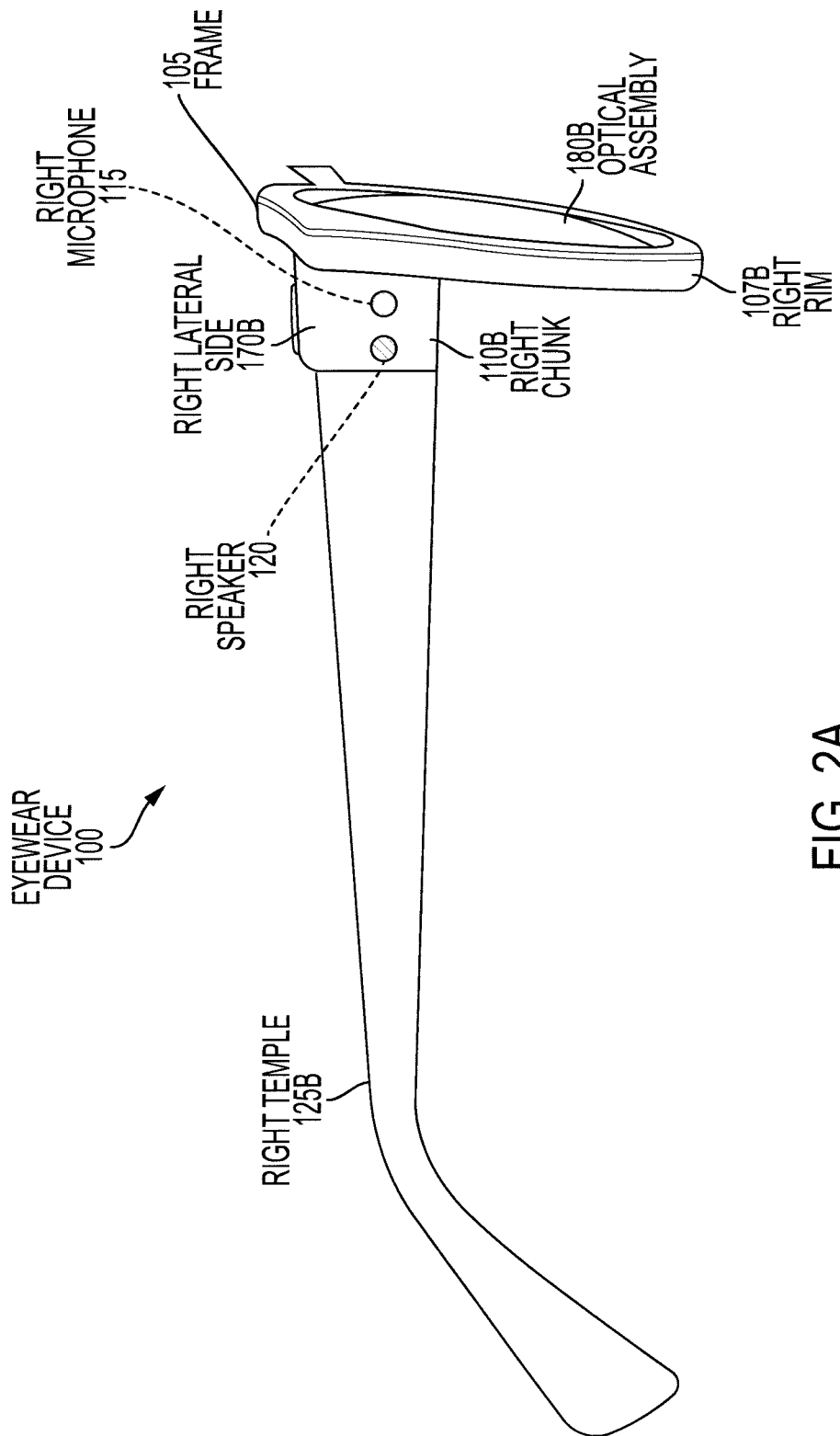
FIG. 2A is a right side view of an example hardware configuration of an eyewear device, showing a substantially similar configuration to FIG. 1A except that this figure shows a right microphone and a right speaker connected to the inside of the right chunk of the eyewear device.

FIG. 2A is a side view of an example hardware configuration of an eyewear device 100. Specifically, it illustrates the right side of the eyewear device 100, in a configuration similar to the example in FIG. 1A. This example shows the right microphone 115 and right speaker 120 as attached to the right chunk 110B, and on the internal side of the eyewear device 100, to facilitate collecting user input and projecting call output.

Figure 2B:
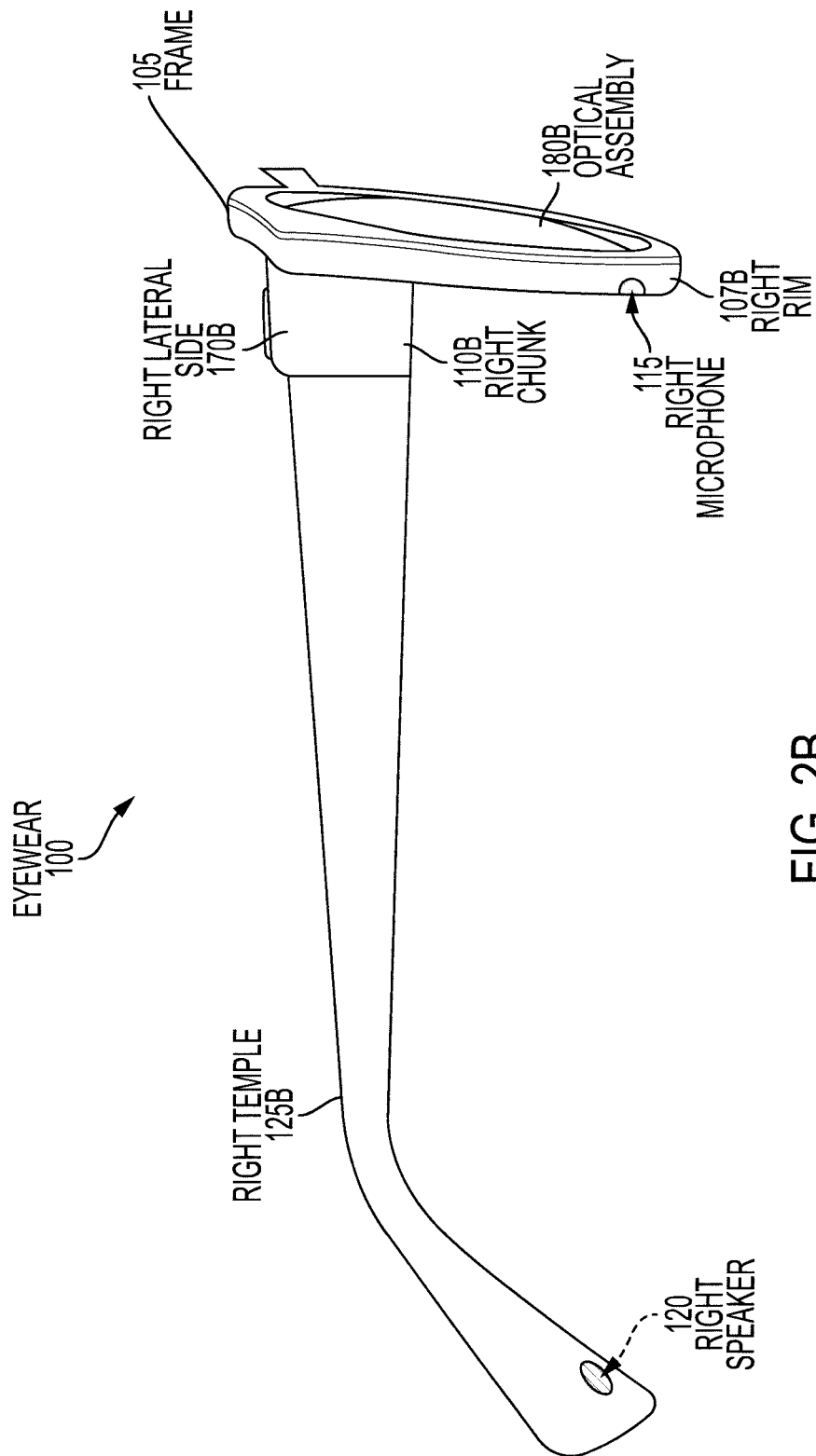
FIG. 2B is a right side view of an example hardware configuration of an eyewear device, which includes a right microphone connected to the bottom of the right rim, and a right speaker connected to the right temple.

FIG. 2B is another side view of an example hardware configuration of an eyewear device 100. In this example, the right microphone 115 is connected to the right rim 107B in order to achieve a shorter distance for input sound to travel to the right microphone 115 from the user's mouth. Additionally, the right speaker 120 is located far back on the interior of the right temple 125B. This position also facilitates a shorter distance for output sound to travel, by reducing the distance between the user's ear and the right speaker 120.

Figure 3:
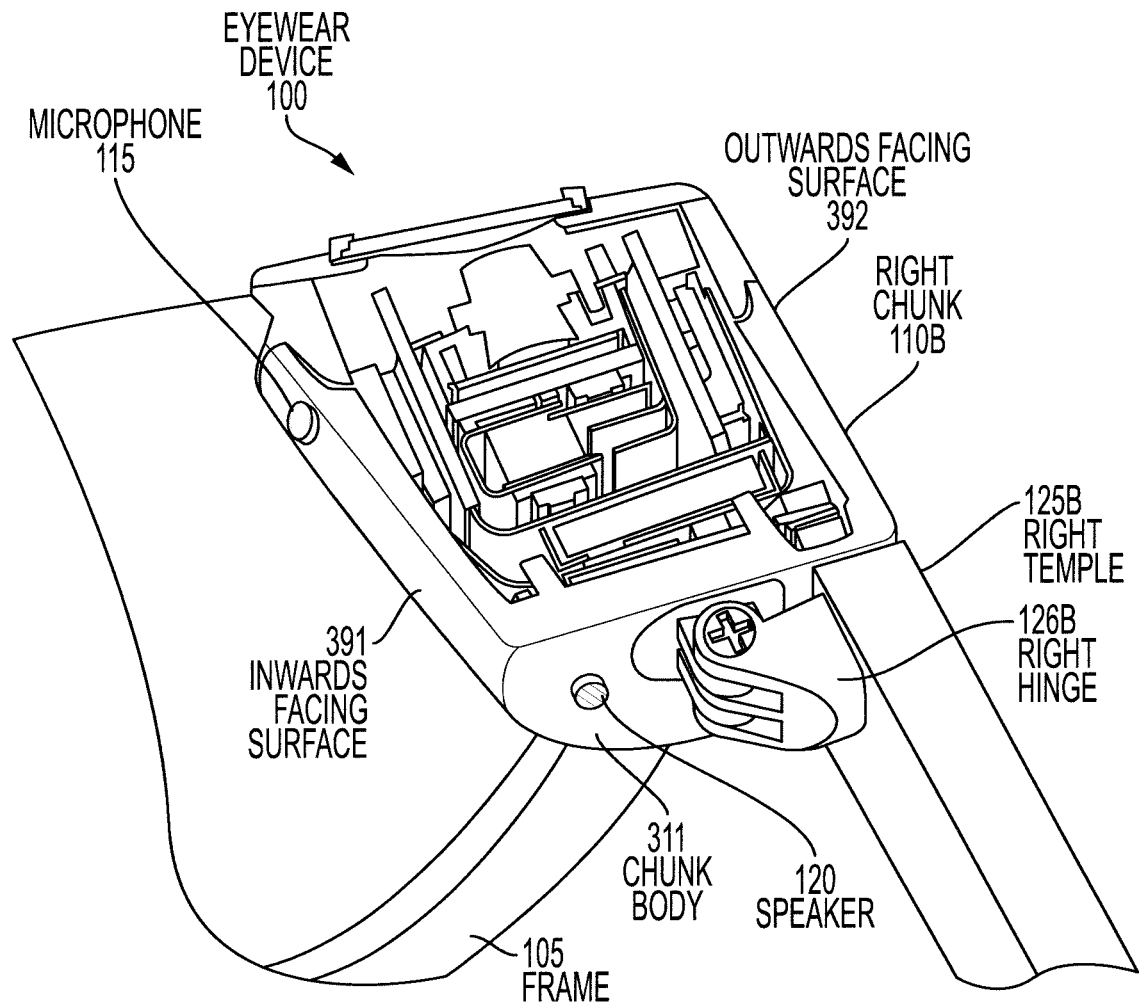
FIG. 3 is a cross-sectional view taken through the right chunk of an eyewear device, which includes a microphone and speaker connected to the interior face of the right chunk.

FIG. 3 is a cross-sectional view through the right chunk 110B, right temple 125B and the frame 105 seen in FIG. 1A and FIG. 2A. This example emphasizes that the right microphone 115 and right speaker 120 are located on the inwards facing surface 391 (e.g. as opposed to the outwards facing surface 392) of the right chunk 110B. Interior to the chunk body 311 itself are computing components, which may include the processor 843, memory 844, and a digital signal processor 812 if it exists.

Figure 4:
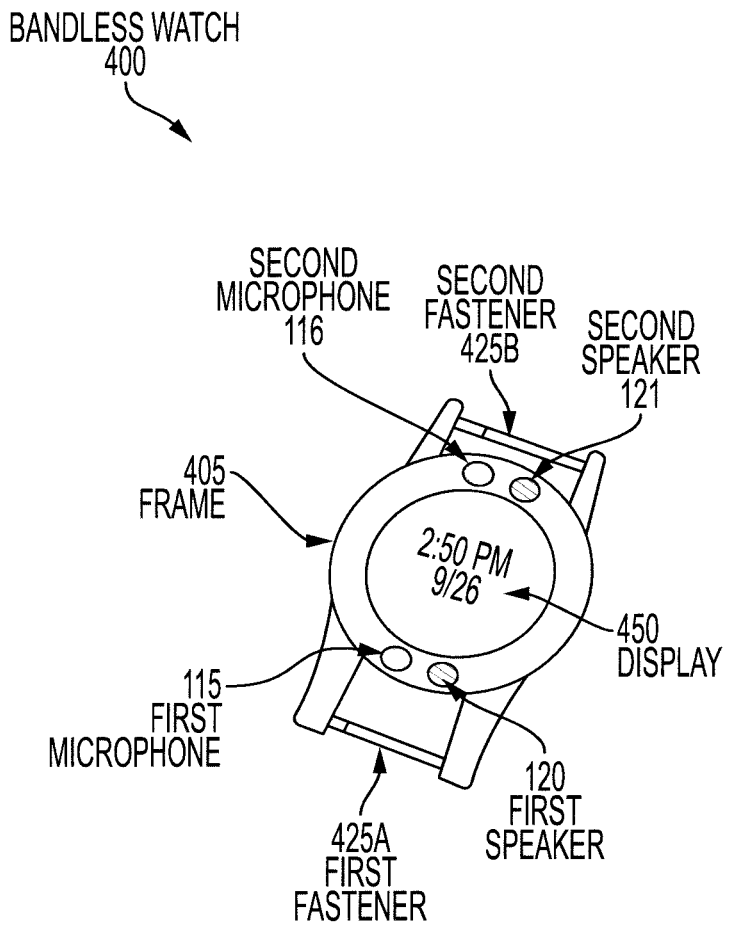
FIG. 4 is a front view of an example hardware configuration of a bandless watch device, which includes a microphone and speaker on the top of the watch face, as well as a microphone and speaker on the bottom of the watch face.

FIG. 4 is front view of an example hardware configuration of a wearable device, configured to operate as a watch. Watch straps or bands can be connected to the fasteners 425, such as a leather strap, a NATO strap, a rally strap, or any other strap or band used to affix a watch to a location. Attaching a band or operating the watch in this example without a band does not have a material effect on the functionality of the watch.

The bandless watch 400 has a frame 405 that can be divided into two halves. The first half is connected to a first fastener 425A, which in this example is a watch lug with a spring bar, a first microphone 115, and a first speaker 120. The second half is connected to a second fastener 425B, which in this example is also a watch lug with a spring bar, a second microphone 116, and a second speaker 121. The fasteners 425 do not need to be specifically watch lugs and spring bars: they can omit the spring bar, or they could be a proprietary system for clasping or fastening a band to the bandless watch. The fasteners 425 are able to accept and connect to some kind of band that conventionally can be worn around the wrist.

These two halves of the bandless watch 400 are able to perform the same functionality found in the eyewear device of FIG. 1A (i.e., attaching the watch to the wearer), using the display 450 and user's arm as occlusion devices to improve sound quality when performing a duplex call. It is capable of using the method of activating a single microphone 115, 116 and a single opposed speaker 121,120, and either leaving the initial pair selected on for the entire duration of the call, or alternating between pairings (first microphone 115 & second speaker 121, second microphone 116 & first speaker 120) at a rate high enough to simulate sound from both halves of the bandless watch 400 to a user conversing on the call. Like the eyewear device 100, the location and count of speakers 120, 121 and microphones 115, 116 does not need to be congruent between both halves of the bandless watch 400. Single transducers can perform the tasks associated with both the microphone 115, 116 and the speaker 120, 121 of a single half.

Figure 5:
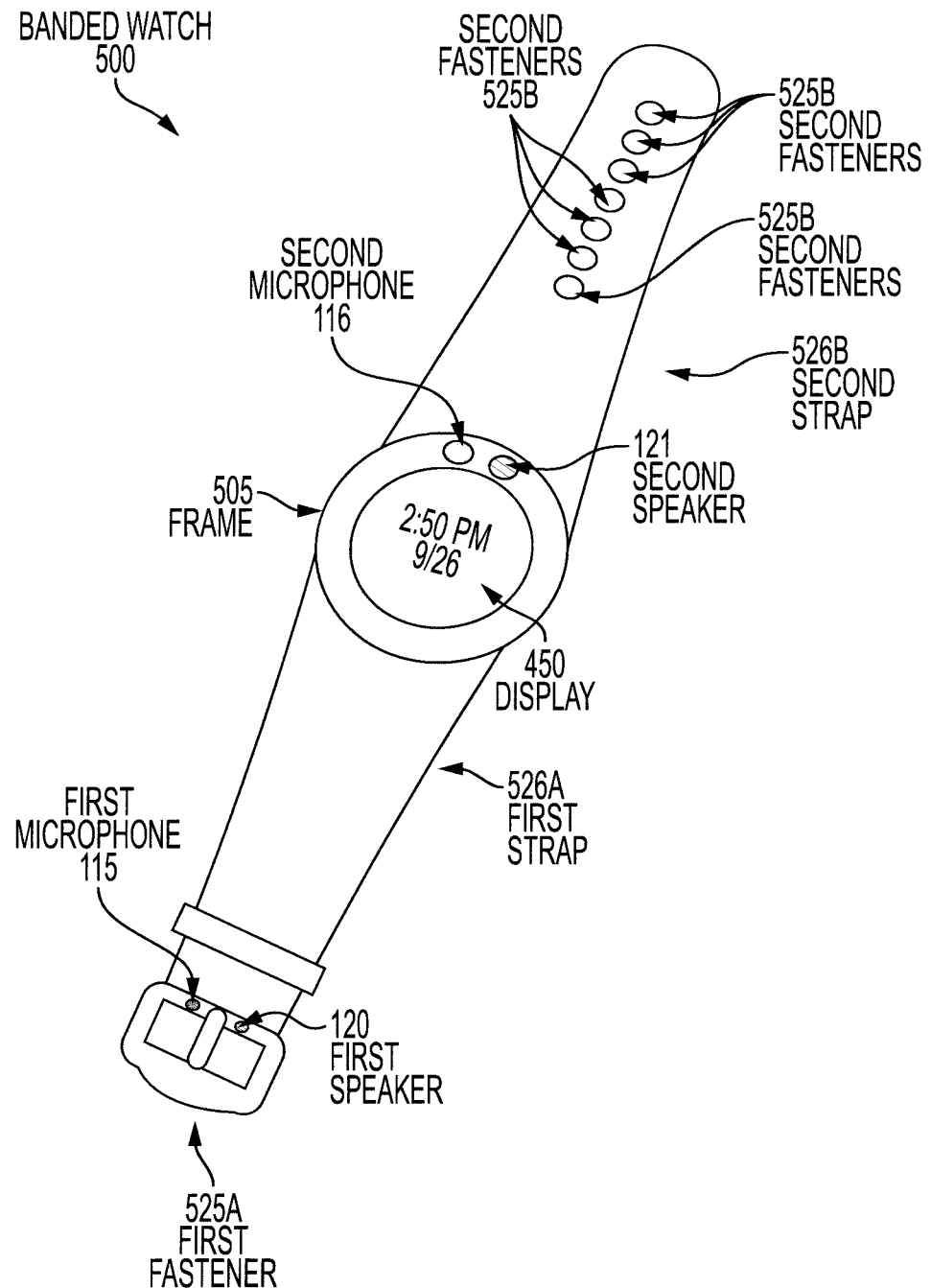
FIG. 5 is a front view of an example hardware configuration of a banded watch device, which includes a microphone and speaker on the top of the watch face, as well as a microphone and speaker in the buckle fastener of the watch band.

FIG. 5 is front view of an example hardware configuration of a wearable device, configured to operate as a watch. This particular watch has a band connected to the device.

The banded watch 500 has a frame 505 that can be divided into two halves. The first half is connected to a first fastener 525A, a first microphone 115, and a first speaker 120. The first fastener 525A in this example is a buckle, connected to the frame 505 by a first strap 526A. Other first fasteners 525A could be a hook, or Velcro, or other conventional watch fasteners.

The composition of the strap 526 can be any conventional material used in a watch band. Some examples are leather, cloth, or metal. The strap 526 and fastener 525A can also be semi-elastic, curved, and tensed, such that with pressure both can be deflected to open and allow a user's wrist to enter. With the pressure removed, both the strap 526 and fastener 525A return to their original shape, forcing the banded watch 500 to remain on the wrist until such pressure is applied again, and the wrist is removed.

The first strap 526A has an interior electrical component (e.g. electrical connectors, such as wires, interconnects, or other electrical contacts) connecting the first microphone 115 and first speaker 120 to the frame 505. The frame 505 contains the processor 843 or digital signal processor 812, as well as the memory 844. The second half of the frame 505 is connected to a second fastener 525B, a second strap 526B, a second microphone 116, and a second speaker 121.

The second fastener 525B in this example is a series of holes punctuating the second strap 526B designed to accommodate the buckle first fastener 525A. The second fastener 525B can be any fastener that is able to connect to the implementation of the first fastener 525A.

The second microphone 116 and second speaker 121 are connected to the frame 505 containing the processor 843 or digital signal processor 812, as well as the memory 844. These two halves of the banded watch 500 are able to perform the same functionality found in the eyewear device of FIG. 1A, using the display 450 and the user's arm as occlusion devices to improve sound quality when performing a duplex call. The banded watch 500 is capable of using the method of activating a single microphone 115, 116 and a single opposed speaker 121, 120, and either leaving the initial pair selected activate for the entire duration of the call, or alternating between pairings (first microphone 115 and second speaker 121, second microphone 116 and first speaker 120) at a rate high enough to simulate sound from both halves of the banded watch 500 to a user conversing on the call.

Like the eyewear device 100, the location and count of speakers 120, 121 and microphones 115, 116 does not need to be congruent between both halves of the banded watch 500. Single transducers can perform the tasks associated with both the microphone 115, 116 and the speaker 120, 121 of a single half.

Figure 6:
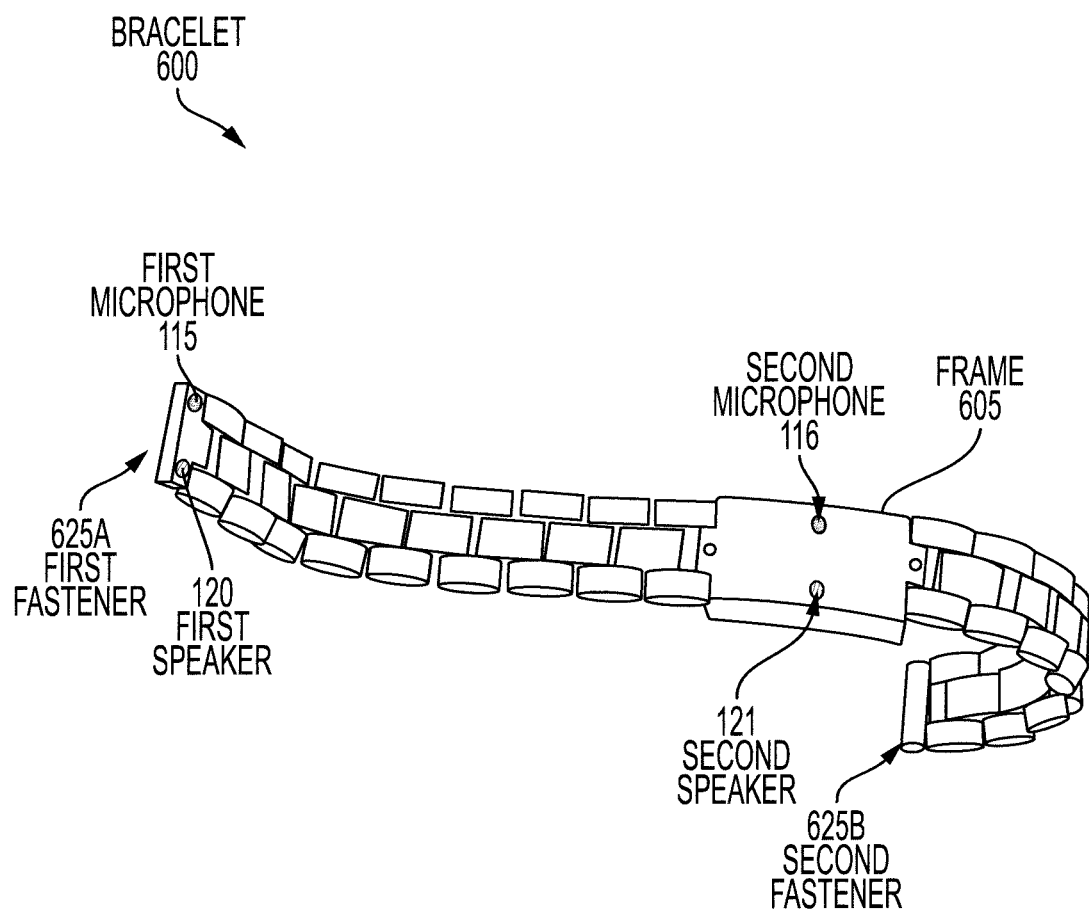
FIG. 6 is a front view of an example hardware configuration of a bracelet device, which includes a microphone and speaker on a frame in the center of the bracelet, as well as a microphone and speaker in the clasp fastener of the bracelet band.

FIG. 6 is a front view of an example hardware configuration of a wearable device, configured to operate as a bracelet 600. The bracelet 600 has a frame 605 that can be divided into two halves. The first half is connected to a first fastener 625A, a first microphone 115, and a first speaker 120. The first fastener 625A in this example is a tight chain ending in a clasp, connected to the frame 605. Other first fasteners 625A could be a buckle, or Velcro, or other conventional watch fastener. The fastener 625A can also be semi-elastic, curved, and tensed, such that with pressure the band can be deflected to open and allow a user's wrist to enter. With the pressure removed, the fastener returns to its original shape, forcing the bracelet to remain on the wrist until such pressure is applied again and the wrist is removed.

The first fastener 625A has an interior electrical component (e.g. electrical connectors, such as wires, interconnects, or other electrical contacts) connecting the first microphone 115 and first speaker 120 to the frame 505 containing the processor 843 or digital signal processor 812 as well as the memory 844.

The second half is connected to a second fastener 525B, a second microphone 116, and a second speaker 121. The second fastener 625B in this example is a tight chain ending in a complimentary clasp, configured to accommodate the clasp first fastener 625A. The second fastener 625B can be any fastener that is able to connect to the implementation of the first fastener 625A.

The second fastener 625B has an interior electrical component (e.g. electrical connectors, such as wires, interconnects, or other electrical contacts) connecting the second microphone 116 and second speaker 121 to the frame 505 containing the processor 843 or digital signal processor 812, as well as the memory 844. These two halves of the bracelet 600 are able to perform the same functionality found in the eyewear device of FIG. 1A, using the length of the first fastener 625A and the user's arm as occlusion devices to improve sound quality when performing a duplex call. The bracelet 600 is capable of using the method of activating a single microphone 115, 116 and a single opposed speaker 121, 120, and either leaving the initial pair selected activated for the entire duration of the call, or alternating between pairings (first microphone 115 and second speaker 121, second microphone 116 and first speaker 120) at a rate high enough to simulate sound from both halves of the bracelet 600 to a user conversing on the call.

Like the eyewear device 100, the location and count of speakers 120, 121 and microphones 115, 116 does not need to be congruent between both halves of the bracelet 600. Single transducers can perform the tasks associated with both the microphone 115, 116 and the speaker 120, 121 of a single half.

Figure 7:
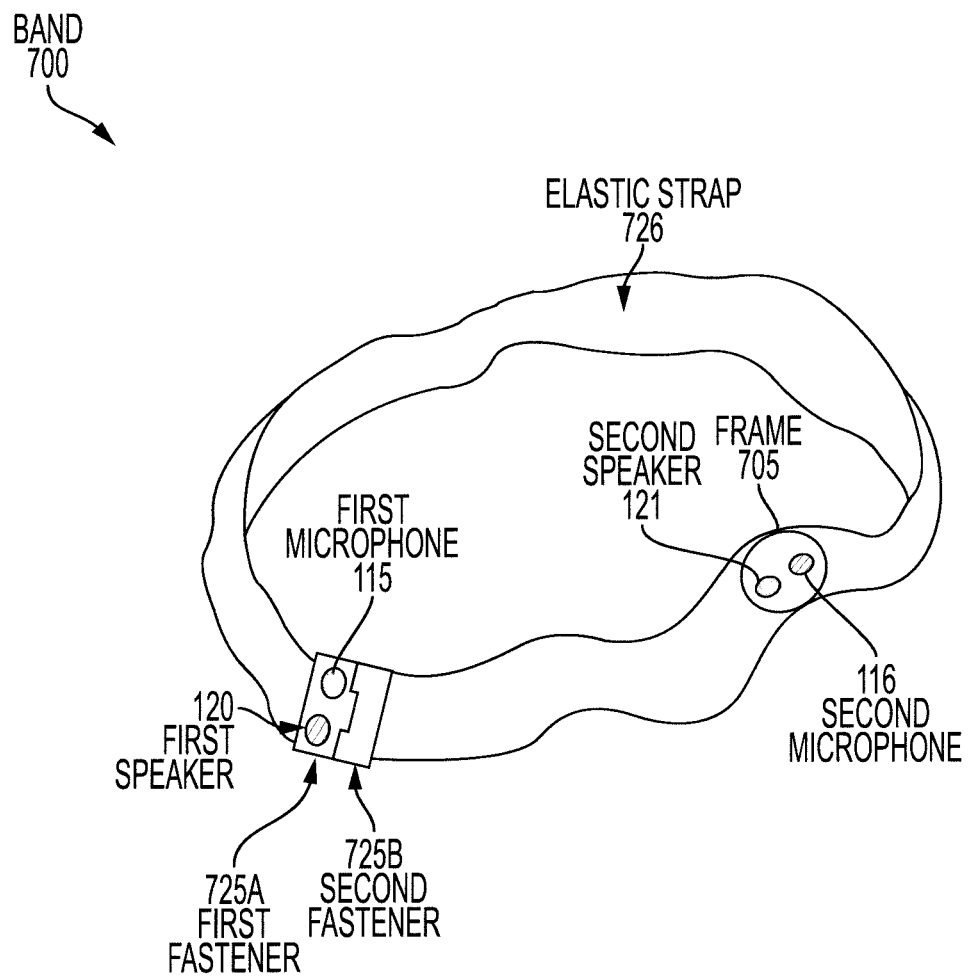
FIG. 7 is a front view of an example hardware configuration of an elastic band device, which includes a microphone and speaker on a frame attached near the middle of the band, as well as a microphone and speaker in the fasteners that close the band loop of the elastic strap.

FIG. 7 is a front view of an example hardware configuration of a wearable device, configured to operate as a band 700. This band may be worn on the head, but other bands could be worn around different parts of the user's body.

The band 700 has a frame that can be divided into two halves. The first half is connected to a first fastener 725A, a first microphone 115, and a first speaker 120. The first fastener in this example is a plastic hooking clasp, connected to the frame 705 by an elastic strap 726 that runs from the first fastener 725A, through the frame 705, to the second fastener 725B. Other first fasteners could be a buckle, or Velcro, or other conventional band fastener.

The first fastener 725A and elastic strap 726 has an interior electrical component (e.g. electrical connectors, such as wires, interconnects, or other electrical contacts) connecting the first microphone 115 and first speaker 120 to the frame 705 containing the processor 843 or digital signal processor 812, as well as the memory 844.

The second half is connected to a second fastener 725B, a second microphone 116, and a second speaker 121. The second fastener 725B can be essentially any fastener that is able to connect to the implementation of the first fastener 725A. The second microphone 116 and second speaker are connected to the second half of the frame 705 containing the processor 843 or digital signal processor 812, as well as the memory 844. These two halves of the band 700 are able to perform the same functionality found in the eyewear device of FIG. 1A, using the user's body as an occlusion device to improve sound quality when performing a duplex call. The band 700 is capable of using the method of activating a single microphone 115, 116 and a single opposed speaker 121, 120, and either leaving the initial pair selected active for the entire duration of the call or alternating between pairings (first microphone 115 & second speaker 121, second microphone 116 & first speaker 120) at a rate high enough to simulate sound from both halves of the band 700 to a user conversing on the call.

Like the eyewear device 100, the location and count of speakers 120, 121 and microphones 115, 116 does not need to be congruent between both halves of the band 700. Single transducers can perform the tasks associated with both the microphone 115, 116 and the speaker 120, 121 of a single half.

Figure 8:
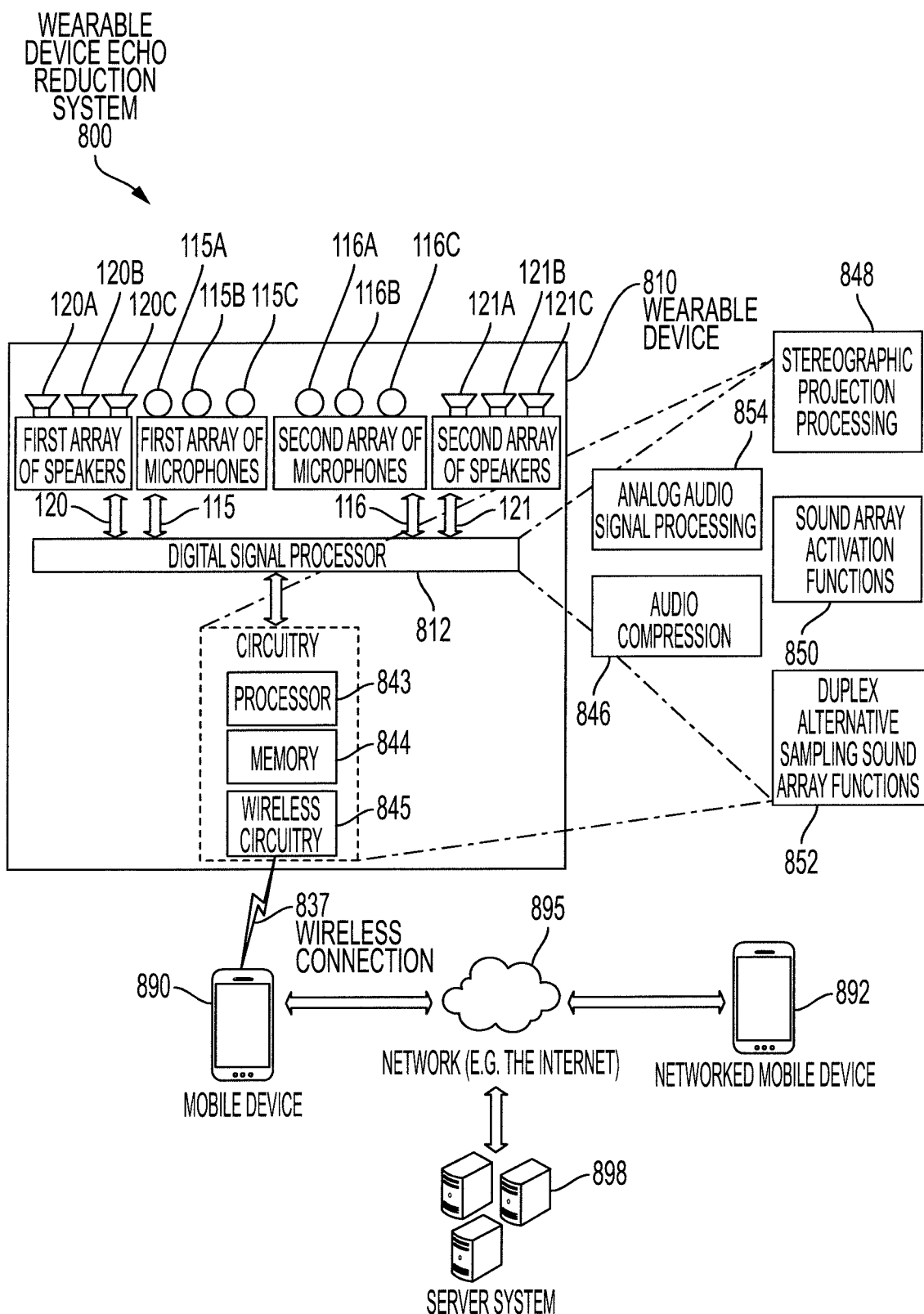
FIG. 8 is a high-level functional block diagram of an example echo reduction system including a wearable device, a mobile device, a calling networked mobile device, and a server system connected via various networks.

FIG. 8 is a high level functional block diagram of an example wearable device echo reduction system 800 for non-echo duplex conversations. The wearable device echo reduction system 800 includes the wearable device 810 itself, a mobile device 890, and a server system 898. Mobile device 890 may be a smartphone, tablet, laptop computer, access point, or any other such device capable of connecting with wearable device 810 using a wireless connection 837. Mobile device 890 is connected to server system 898 and network 895. The network 895 may include wired and/or wireless connections. For duplex calling, there is also another networked mobile device 892 being operated by a second party on the duplex call. This networked mobile device 892 sends and receives digital audio signals over the network 895 to the mobile device 890, which can process and then forward audio data to the wearable device 810.

Server system 898 may be one or more computing devices as part of a service or network computing system, for example, that include a processor, a memory, and network communication interface to communicate over the network 895 with the mobile device 890 and wearable device 810. Execution of the programming by the processor of the server system 898 can cause the server system 898 to perform some or all of the functions described herein, for example, to transform the sound pattern from the first 115 and second 116 array of microphones into a single stereo stream, or split a stereo stream into separate streams for the first 120 and second 121 array of speakers.

Wearable device 810 may optionally include additional peripheral device elements and a display integrated with wearable device 810. Such peripheral device elements may include biometric sensors, additional sensors, or display elements integrated with wearable device 810. For example, peripheral device elements may include any I/O components including output components, motion components, position components, or any other such elements described herein.

Output components include visual components (e.g., a display such as a plasma display panel (PDP), a light emitting diode (LED) display, a liquid crystal display (LCD), or a projector), acoustic components (e.g., speakers) not used in duplex calling, haptic components (e.g., a vibratory motor), other signal generators, and so forth. The input components include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone) not used in duplex calling, and the like.

For example, the biometric components may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such location coordinates can also be received over wireless connections 837 from the mobile device 890 via the wireless circuitry 845.

Wearable device 810 includes a body containing a first array of speakers 120, a second array of speakers 121, a first array of microphones 115, a second array of microphones 116, and in this example, it includes the optional digital signal processor 812. The body is divisible roughly into two halves. The functionality of the digital signal processor can be integrated fully or in part into the processor 843 functionality, the mobile device 890, or the server system 898. The arrays of speakers 120, 121 and microphones 115, 116 can each have one or more speakers or microphones respectively within their arrays—arrays of one are valid arrays. Additionally the physical microphones, for example 120A and 115A, can be combined into a single physical transducer. The arrays 115, 116, 120, 121 are conceptual, and do not necessarily physically exist—e.g., they allow for facilitating discussing the relationships between speakers, microphones, outputs, and inputs, but a physical implementation will generally see the digital signal processor 812 or the processor 843 having programming to know which conceptual array 115, 116, 120, 121 a speaker 120A-C 121A-C or microphone 115A-C 116A-C belongs to. The speakers 120A-C in the first speaker array 120 are all physically on the first side of the body of the wearable device. The speakers 121A-C in the second speaker array 121 are all physically on the second side of the body of the wearable device. The microphones 115A-C in the first microphone array 115 are all physically on the first side of the body of the wearable device. The microphones 116A-C in the second microphone array 116 are all physically on the second side of the body of the wearable device. The components within the wearable device 810 are located on one or more circuit boards, for example a PCB or flexible PCB, in the chunks or frames. Alternatively or additionally, the depicted components can be located in the body, frame, or fasteners of the wearable device.

In one example, the digital signal processor (DSP) 812 includes a microprocessor integrated circuit (IC) customized for processing electrical signals from the microphones 115, 116 into a digital output signal that can be efficiently transferred out of the wearable device 810, as well as processing digital input signals into electrical signals for the speakers 120, 121 to output as audio. The digital output includes two audio output channels, one from each of the microphones 115, 116, that are each complimentary parts of a digital stereo output signal. Similarly, the digital input includes two audio input channels, which will be separately provided to each of the speakers 120, 121, that are each complimentary parts of a digital stereo input signal. The DSP 812 utilizes volatile memory. In order to reduce the amount of time that the DSP 812 takes when powering on to processing data, a non-volatile read only memory (ROM) may be integrated on the IC with instructions for operating or booting the DSP 812. This ROM may be minimized to match a minimum size needed to provide basic functionality for gathering electrical sound signals from microphones 115, 116 and sending electrical sound signals to speakers 120, 121, such that no extra functionality that would cause delays in boot time are present. The ROM may be configured with direct memory access (DMA) to the volatile memory of the microprocessor of DSP 812. DMA allows memory-to-memory transfer of data from the ROM to system memory of the DSP 812 independent of operation of a main controller of DSP 812. Providing DMA to this boot ROM further reduces the amount of time from power on of the DSP 812 until sound data from the microphones 115, 116 and to the speakers 120, 121 can be processed and stored. In some examples, minimal processing of the sound signal from the microphones 115, 116 and to the speakers 120, 121 is performed by the DSP 812, and additional processing may be performed by the processor 843, as well as applications operating on the mobile device 890 or server system 898.

Processor 843 may be essentially any processor capable of managing communications and operation of any general computing system needed for wearable device 810. Processor 843 includes processing resources needed for managing high-speed data transfers on a wireless connection 837 to a wireless local area network (WLAN) using high-speed wireless circuitry 936. Processor 843 may also be configured to receive input signals or instruction communications from mobile device 890 via a wireless connection 837 utilizing low-power. In some examples, the processor 843 executes an operating system such as a LINUX operating system or other such operating system. In addition to any other responsibilities, the processor 843 executing a software architecture for the wearable device 810 is used to manage data transfers with wireless circuitry 845.

Wireless circuitry 845 includes circuit elements for implementing a wireless communication system via a network. Bluetooth™ Smart, also known as Bluetooth™ low energy, is one standard implementation of a wireless communication system that may be used to implement wireless circuitry 824. In other examples, other communication systems may be used, such as Institute of Electrical and Electronic Engineers (IEEE) 802.11 communication standards, also referred to herein as Wi-Fi.

Memory 844 includes essentially any storage device capable of storing audio data generated by the microphones 115, 116, the DSP 812, the processor, and incoming audio data from the mobile device 890. While memory 834 is shown as integrated with circuitry, in other examples, memory 844 may be an independent standalone element of the wearable device 810. In some examples, electrical routing lines may provide a connection through a chip that includes the processor 843 from the DSP 812 to the memory 844.

There is programming specific to the functionality of the non-echo duplex calling. This programming can be implemented in the DSP 812, the processor 843, the mobile device 890, or the server system 898. In this example, the programming of this functionality is entirely located in the DSP 812, in order to make the management of the microphones 115, 116 and speakers 120, 121 as direct as possible.

There is programming to process the analog audio signals 854, either out to the speakers 120, 121 or in from the microphones 115, 116. This programming converts between analog wave patterns of sound signals, and a digital transform of the wave patterns for more efficient storage and transfer. This programming may also process the data with algorithms known to a person of skill in the art to remove duplex audio echo, similar to algorithms found in noise-cancelling headphones.

There is additionally programming to compress and decompress these digital audio signals 846. As an example, this includes programming to condense signals into a smaller memory space, analogous to applying PKZIP compression algorithms to a generic file. This programming also might include any algorithms that determine the standard human voice frequency range, and removing audio data outside of that range.

Further, there is optionally programming to perform stereographic projection processing 848, in order to best determine at what volumes various speakers 120, 121 should operate at relative to each other in order to produce a clear, but relatively low decibel sound for the listening user.

More programming exists in order to control the sound arrays 850, both the microphones 115, 116, and both the speakers 120, 121. This programming determines when to activate certain arrays and allow audio data to stream to or from these arrays, in order to increase call clarity. This programming activates the left microphone array 115, which includes any attached microphones 115A-C, and activates the right speaker array 121, which includes any attached speakers 121A-C, while deactivating or disabling the right microphone array 116, which includes any attached microphones 116A-C, and deactivating or disabling the right speaker array 121 which includes any attached speakers 121A-C. It also includes programming to do the opposite, meaning activating the right microphone array 116 and left speaker array 120, and deactivating or disabling the left microphone array 115 and right speaker array 121.

Additionally, the programming can include a function to perform alternative sampling on a duplex call 852. This programming uses the functions provided by the sound array activation functions 850, but alternates between performing those two function at a rate of speed high enough to create the illusion that both speaker arrays 120, 121 are simultaneously active, when in reality each speaker array is only active when the other speaker array is not, which in one example is approximately half the time. This alternation allows the user to perceive duplex audio from their speakers, while their microphone arrays 115, which have a materially higher rate of sampling than a human ear, can register the alternation of the speakers, and therefore can only pick up sound from cycles where the active speaker is on the opposite side of the wearable device, which will be dampened by the occlusion caused by the increased distance between microphone and speaker as well as the user's body. A microphone array will not pick up sound from a speaker array on the same side of the wearable device, because that speaker array will not be generating sound at the time the microphone array is active and detecting sound.

Figure 9:
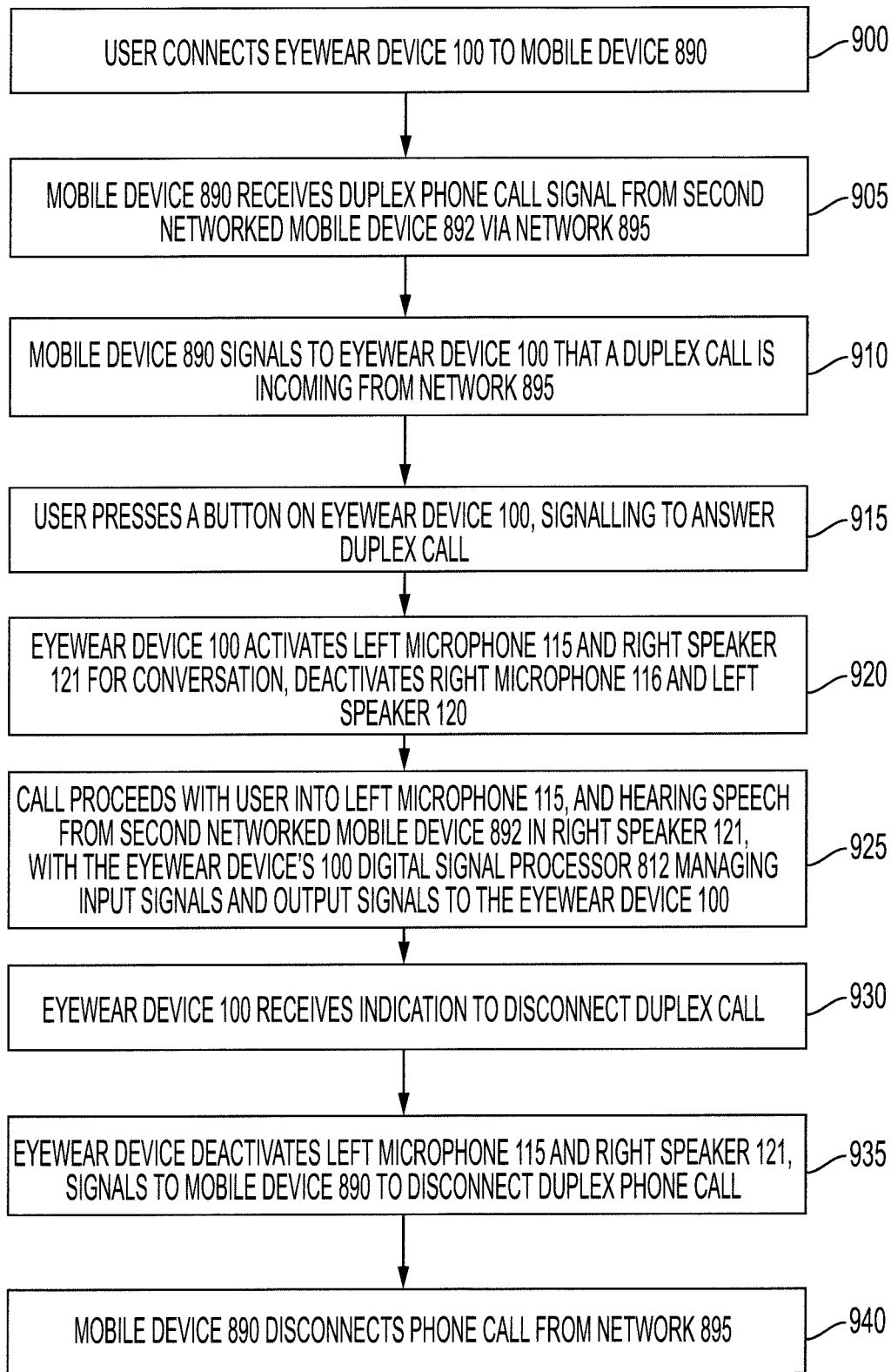
FIG. 9 is a flowchart of the operation of the wearable device when performing echo reduction on a duplex call by activating a speaker and microphone that are separated by the wearer's body, and using the same speaker and microphone for the duration of the call.
Figure 10:
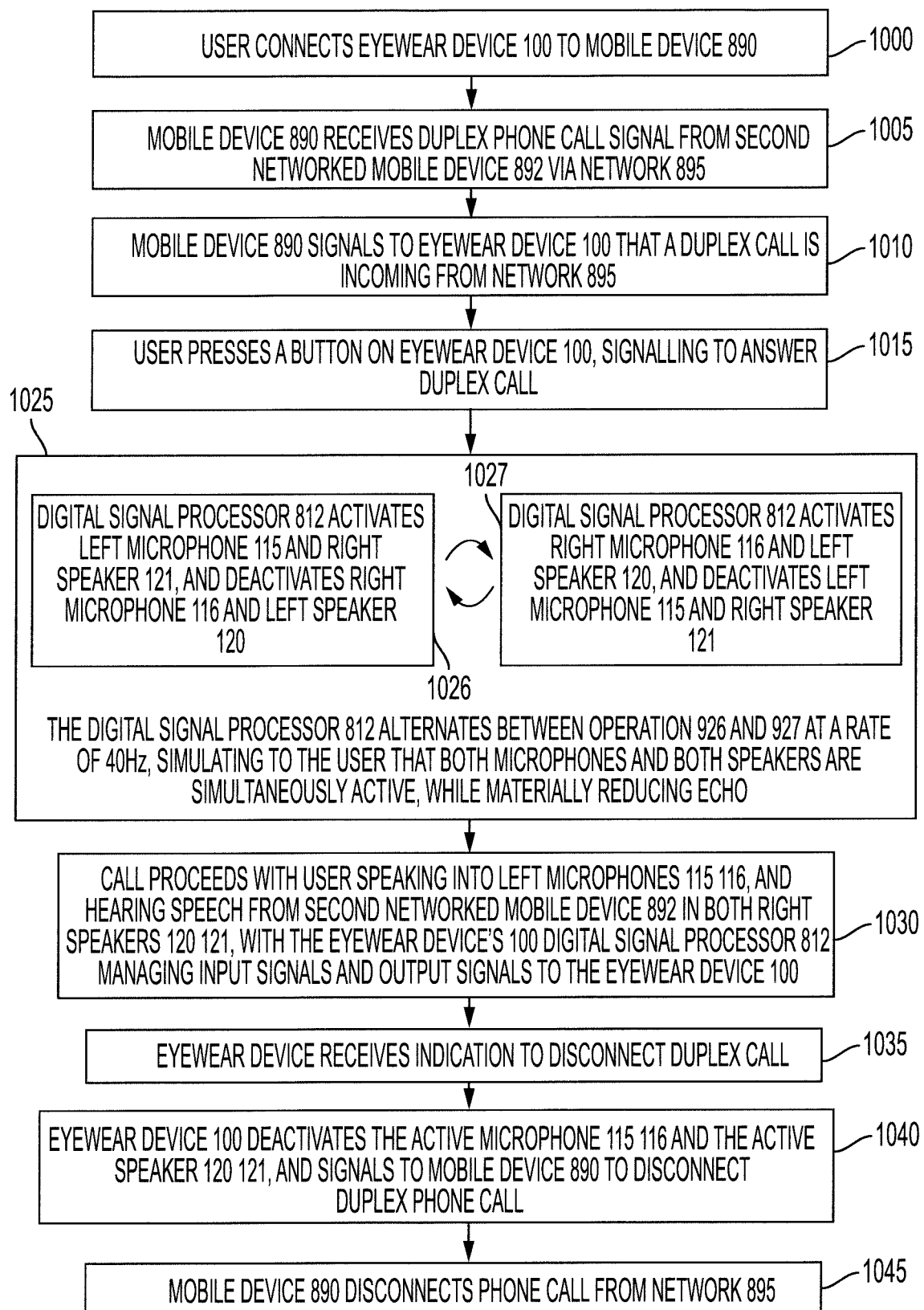
FIG. 10 is a flowchart of the operation of the wearable device when performing echo reduction on a duplex call by alternating the activation of speakers on one side of the wearer and the activation of speakers on the other side of the wearer, with the activation of microphones on one side of the wearer and the activation of speakers on the other side of wearer, such that speakers and microphones on the same side of the wearer are never active at the same time, for the duration of the call.

FIG. 9 is a high level functional block diagram of an example of a mobile device (e.g., mobile device 890) that connects to an eyewear device (e.g., eyewear device 100) implementation of a wearable device (e.g., wearable device 810), and then receives and performs a duplex call with a networked mobile device (e.g., networked mobile device 892), while reducing echo by activating microphones (e.g., microphone 115) and speakers (e.g., speaker 121) on opposite sides of the eyewear device. Although the operations of functional block diagram of FIG. 9 and FIG. 10 are described with reference to devices described herein, other devices suitable for performing the operations will be understood by one of skill in the art from the description herein.

In operation 900, an eyewear device 100 connects to a mobile device 890. In an example, the connection is a Bluetooth™ connection. The eyewear device 100 may connect (i.e., pair) with the mobile device 890 in a manner that would be known to a person skilled in the art from the description herein.

In operation 905 the mobile device 890 receives a duplex phone call signal request from a second, networked, mobile device 892 via the network 895.

In operation 910, the mobile device 890 indicates to the eyewear device that a duplex call is incoming. The user may press a first button on the eyewear device 100 in operation 915 signaling that they want to accept the duplex call. This indication is passed from the eyewear device 100 to the mobile device 890, which opens a duplex call. The manner in which the user signals to the eyewear device that they wish to answer the call could be, for example, a button press on a button of the eyewear device or the mobile device, a touch on a touch-sensitive area of the eyewear device or the mobile device, or an eye-tracking device associated with the eyewear device or the mobile device seeking a specific pattern from the user's eye.

In operation 920, the eyewear device activates the left microphone 115 and the right speaker 121 for conversation while deactivating the right microphone 116 and the left speaker 120. The eyewear device 100 activates the left side microphone 115 and the right side speaker 121, while leaving the left side speaker and right side microphone deactivated (or vice versa) in order to reduce unwanted echo on the duplex call). The eyewear device deactivates (e.g., disables or ignores) the right side microphone 116 and prevents output from the left side speaker 120 when the left side microphone is active (or vice versa). Occlusion provided by distance and the user's body (e.g., head in this implementation) between the left side microphone 115 and the right side speaker 121 decreases echo on the duplex call that would otherwise be present if the right side microphone 116 or the left side speaker 120 were activated and receiving and producing sound.

In operation 925, the call proceeds with the user's speech picked up by the left microphone 115, and with the networked mobile device's 892 speech being presented by the right speaker throughout the entire call. Both the user of the eyewear device/mobile device 890 and the user of the networked mobile device 892 experience less duplex echo than they would if all speakers and microphones were activated.

At operation 930, the eyewear device or mobile device 890 receives an indication that the call is complete. The user may signal the call is complete by pressing a button (e.g., a second button) on the eyewear device or mobile device 890, signaling to the eyewear device 100 that the call is complete. The eyewear device then deactivates the left microphone 115 and the right speaker 121, and signals to the mobile device 890 to disconnect from the duplex call, completing operation 935. Finally, in operation 940, the mobile device 890 disconnects from the duplex call relayed via the network 895.

FIG. 10 is a high level functional block diagram of an example of a mobile device (e.g., mobile device 890) that connects to an eyewear device (e.g., eyewear device 100) implementation of a wearable device (e.g. wearable device 810), and then receives and performs a duplex call with a networked mobile device (e.g., networked mobile device 892), while reducing echo by activating microphones (e.g., microphone 115) and speakers (e.g., speaker 121) on opposite sides of the eyewear device. Additionally, in this example the eyewear device has programming allowing it to alternate activating microphones 115, 116 and speakers 120, 121 on opposite sides of the eyewear device, e.g., at a rate that simulates stereo calling for the user.

In operation 1000, an eyewear device 100 connects to a mobile device 890. In an example, the connection is a Bluetooth™ connection. The eyewear device 100 may connect (i.e., pair) with the mobile device 890 in a manner that would be known a person skilled in the art from the description herein.

In operation 1005 the mobile device 890 receives a duplex phone call signal request from a second, networked, mobile device 892 via the network 895.

In operation 1010, the mobile device 890 indicates to the eyewear device that a duplex call is incoming. The user may press a first button on the eyewear device 100 in operation 1015 signaling that they want to accept the duplex call. This indication is passed from the eyewear device 100 to the mobile device 890, which opens a duplex call. The manner in which the user signals to the eyewear device that they wish to answer the call could be, for example, a button press on a button of the eyewear device or the mobile device, a touch on a touch-sensitive area of the eyewear device or the mobile device, or an eye-tracking device associated with the eyewear device or the mobile device seeking a specific pattern from the user's eye.

In operation 1025, the eyewear device 100 alternates between operation 1026 and operation 1027 in order to reduce unwanted echo on the duplex call. In operation 1025, operation 1026 may first be performed, followed by operation 1027 is performed. Thereafter, the eyewear device alternates between operation 1026 and operation 1027 for the duration of the call. This alternation may occur at a rate equal to or higher than the sampling rate of the human ear. For example, the alternation frequency is greater than approximately 40 Hz (e.g., greater than 44 Hz).

In operation 1026 the digital signal processor 812 activates the left side microphone 115 and the right side speaker 121, while leaving the left side speaker and right side microphone deactivated. The digital signal processor 812 deactivates (e.g., disables or ignores) the right side microphone 116 and prevents output from the left side speaker 120 when the left side microphone is active. Occlusion provided by distance and the user's body (e.g., head in this implementation) between the left side microphone 115 and the right side speaker 121 decreases echo on the duplex call that would otherwise be present if the right side microphone 116 or the left side speaker 120 were activated and receiving and producing sound.

Operation 1027 involves the digital signal processor 812 activating the right side microphone 116 and the left side speaker 120, while leaving the right side speaker and the left side microphone deactivated. The digital signal processor 812 deactivates (e.g., disables or ignores) the left side microphone 115 and prevents output from the right side speaker 121 when the right side microphone is active. Occlusion provided by distance and the user's body (e.g., head in this implementation) between the right side microphone 116 and the left side speaker 120 decreases echo on the duplex call that would otherwise be present if the left side microphone 115 or the right side speaker 121 were activated and receiving and producing sound.

Due to operation 1025, the user will perceive stereo sound. Despite each speaker 120, 121 only being on half or less of the duration of the alternating operation 1025, the switching occurs quickly enough that the user's ears perceive constant sound coming from both the left speaker 120 and the right speaker 121. Additionally, the networked mobile device 892 will perceive constant sound signal from the wearable device 810, despite each microphone 115, 116 on the wearable device 810 only being on half or less of the duration of the alternating operation 1025.

In operation 1030, the call proceeds, with the user's speech picked up by the active microphone, either left 115 or right 116, and with the networked mobile device's 892 speech being presented by the active speaker, right 121 or left 120, respective to the current cycle of the alternation operation 1025. Assuming both the eyewear device and the networked mobile device implement the methods described herein, both the user of the eyewear device/mobile device 890 and the user of the networked mobile device 892 will experience less duplex echo than they would have were all speakers 120, 121 and microphones 115, 116 activated for the entirety of the duplex call.

At operation 1035, the eyewear device or mobile device 890 receives an indication that the call is complete. The user may signal the call is complete by pressing a button (e.g., a second button) on the eyewear device or mobile device 890, signaling to the eyewear device 100 that the call is complete. The eyewear device then deactivates the microphones 115, 116 and the speakers 120, 121, and signals to the mobile device 890 to disconnect from the duplex call, completing operation 1040. Finally, in operation 1045, the mobile device 890 disconnects from the duplex call relayed via the network 895.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that includes the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

For ease of reading in the foregoing Detailed Description, the terms "left" and "right" have been used in some places instead of "first" and "second." It can be understood that "left" is to mean "first" when "right" is to mean "second." Conversely, "left" is to mean "second" when "right" is to mean "first." As previously discussed, the absolute sagittal, transversal, coronal, or directional labelling used for the first and second sides, microphones, speakers, and other elements are not material—focus is to be placed upon the divided nature of the wearable, and the relative positioning between a first or second, or left and right element, to elements of the opposing label.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A wearable device comprising:
   a body comprising a first fastener, a second fastener, and a frame coupled between the first and second fasteners, the frame having a first section and a second section, the body having a first portion including the first section of the frame and the first fastener and a second portion including the second section of the frame and the second fastener;
   a first speaker connected to the first portion of the body;
   a second speaker connected to the second portion of the body;
   a first microphone connected to the first portion of the body;
   a second microphone connected to the second portion of the body;
   a processor;
   a memory accessible to the processor; and
   programming in the memory, wherein execution of the programming by the processor configures the wearable device to perform functions, including functions to:
   selectively activate the first speaker;
   selectively activate the second microphone;
   emit a first output sound signal via the activated first speaker while the first microphone and the second speaker are deactivated; and
   capture a first input sound signal via the activated second microphone during the emission of the first output sound signal by the activated first speaker.

2. The wearable device of claim 1, wherein execution of the programming by the processor further configures the wearable device to perform functions to:
   emit a second output sound signal via the activated second speaker while the second microphone and the first speaker are deactivated;
   capture a second input sound signal via the activated first microphone during the emission of the second output sound signal by the activated second speaker; and
   alternate between activating the first speaker to emit the first output sound signal and the second microphone to capture the first input sound signal while the first microphone and the second speaker are deactivated, and activating the second speaker to emit the second output sound signal and the first microphone to capture the second input sound signal while the second microphone and the first speaker are deactivated.

3. The wearable device of claim 2, wherein the function to alternate between activating the first speaker to emit the first output sound signal and the second microphone to capture the first input sound signal while the first microphone and the second speaker are deactivated, and activating the second speaker to emit the second output sound signal and the first microphone to capture the second input sound signal while the second microphone and the first speaker are deactivated further comprises:

the first speaker converting a first audio channel into the first output sound signal and the second speaker converting a second audio channel into the second output sound signal, wherein the first output sound signal and the second output sound signal are combined to create a stereophonic sound signal.

4. The wearable device of claim 3, wherein the function to alternate alternates at a rate faster than 40 cycles per second to simulate stereophonic sound.

5. The wearable device of claim 2, wherein the function to alternate between activating the first speaker to emit the first output sound signal and the second microphone to capture the first input sound signal while the first microphone and the second speaker are deactivated, and activating the second speaker to emit the second output sound signal and the first microphone to capture the second input sound signal while the second microphone and the first speaker are deactivated further comprises:

the first microphone converting the first input audio input signal into a first input sound channel and the second microphone converting the second input audio signal into a second input sound channel, wherein the first input sound channel and the second input sound channel are combined to create a stereophonic electrical signal.

6. The wearable device of claim 2, wherein execution of the programming by the processor further configures the wearable device to perform functions to:

perform acoustic echo cancellation on the second input sound signal from the first microphone and the first input sound signal from the second microphone, and on the first output sound signal to the first speaker and the second output sound signal to the second speaker.

7. The wearable device of claim 1, wherein the wearable device further includes:

a first transducer, wherein the first microphone and the first speaker are co-located in the first transducer.

8. The wearable device of claim 1, wherein:
the wearable device is an eyewear device;
the first fastener is a first temple connected to the first section of the frame on a proximate end of the first fastener; and
the second fastener is a second temple connected to the second section of the frame on a proximate end of the second fastener.

9. The wearable device of claim 8, wherein:
the first section of the frame further comprises:
a first chunk that is integrated into or connected to the first section of the frame;
the first microphone and the first speakers are connected to the first chunk; and
the second section of the frame further comprises:
a second chunk that is integrated into or connected to the second portion of the frame;
the second microphone and the second speaker are connected to the second chunk.

10. The wearable device of claim 8, wherein:
the first speaker is connected to the first temple.

11. The wearable device of claim 10, wherein;
the first microphone is connected to the first temple.

12. The wearable device of claim 1, wherein:
the wearable device is a smartwatch;
the first fastener is a buckle connected to the first section of the frame;
the second fastener is a strap connected to the second section of the frame;
the first microphone and the first speaker are connected to the first fastener; and
the second microphone and the second speaker are connected to the second section of the frame.

13. The wearable device of claim 1, wherein:
the wearable device is a smartwatch;
the first fastener is a first lug and spring bar connected to the first section of the frame;
the second fastener is a second lug and spring bar connected to the second section of the frame;
the first microphone and the first speaker are connected to the first section of the frame; and
the second microphone and the second speaker are connected to the second section of the frame.

14. The wearable device of claim 1, wherein:
the wearable device is a bracelet;
the first fastener is a first clasp connected to the first section of the frame;
the second fastener is a second clasp configured for coupling to the first clasp, the second fastener connected to the second section of the frame;
the first microphone and the first speaker are connected to the first clasp; and
the second microphone and the second speaker are connected to the second section of the frame.

15. A method for use with a wearable device including a body including a first fastener, a second fastener, and a frame coupled between the first and second fasteners, the frame having a first section and a second section, the body having a first portion including the first section of the frame and the first fastener and a second portion including the second section of the frame and the second fastener, the wearable device further including a first speaker and a first microphone connected to the first portion of the body and a second speaker and a second microphone connected to the second portion of the body, the method comprising:

selectively activating the first speaker;
selectively activating the second microphone;
emitting a first output sound signal via the activated first speaker while the first microphone and the second speaker are deactivated; and
capturing a first input sound signal via the activated second microphone during the emission of the output sound signal by the activated first speaker.

16. The method of claim 15, wherein the method further includes:

emitting a second output sound signal via the activated second speaker while the second microphone and the first speaker are deactivated;
capturing a second input sound signal via the activated first microphone during the emitting of the second output sound signal by the activated second speaker; and
alternating between activating the first speaker to emit the first output sound signal and the second microphone to capture the first input sound signal while the first microphone and the second speaker are deactivated, and activating the second speaker to emit the second output sound signal and the first microphone to capture the second input sound signal while the second microphone and the first speaker are deactivated.

17. The method of claim 16, wherein the method further includes:
   the first speaker converting a first output audio channel into the first output sound signal, and the second speaker converting a second output audio channel into the second output sound signal, wherein the first output sound signal and the second output sound signal are combined to create a stereophonic sound signal.

18. The method of claim 17, wherein alternation occurs at a rate faster than 40 cycles per second to simulate stereophonic sound.

19. The method of claim 16, wherein the method further includes:
   the first microphone converting the first input audio signal into a first input sound channel, and the second microphone converting the second input audio signal into a second input sound channel, wherein the first input sound channel and the second input sound channel are combined to create a stereophonic electrical signal.

20. The method of claim 16, wherein the method further includes:
   performing acoustic echo cancellation on the second input sound signal from the first microphone and the first input sound signal from the second microphone, and on the first output sound signal to the first speaker and the second output sound signal to the second speaker.

\* \* \* \* \*